United States Patent [19]

Katz

[11] 4,217,772
[45] Aug. 19, 1980

[54] PROCESS FOR TESTING OF HYDRAULIC RELEASE DEVICES

[76] Inventor: Joseph Katz, Box 69, 529 Main St., Stoneham, Mass. 02180

[21] Appl. No.: 15,663

[22] Filed: Feb. 27, 1979

[51] Int. Cl.³ .................... G01L 27/00; G01M 19/00
[52] U.S. Cl. ........................................ 73/4 R; 73/37
[58] Field of Search ............................ 73/4 R, 37, 804

[56] References Cited
U.S. PATENT DOCUMENTS 3,677,062  7/1972  King ..................................... 73/4 R
4,018,079  4/1977  Landrigan ............................. 73/4 R Primary Examiner—S. Clement Swisher
Attorney, Agent, or Firm—Andrew F. Kehoe; Robert A. Cesari; John McKenna

[57] ABSTRACT

Apparatus for testing hydraulic-release devices of the type used in marine applications and an improved method of testing such devices using the apparatus. The invention includes a positively identified stress rather than a predetermined strain being exerted on such devices before they are subject to the test environment.

5 Claims, 5 Drawing Figures

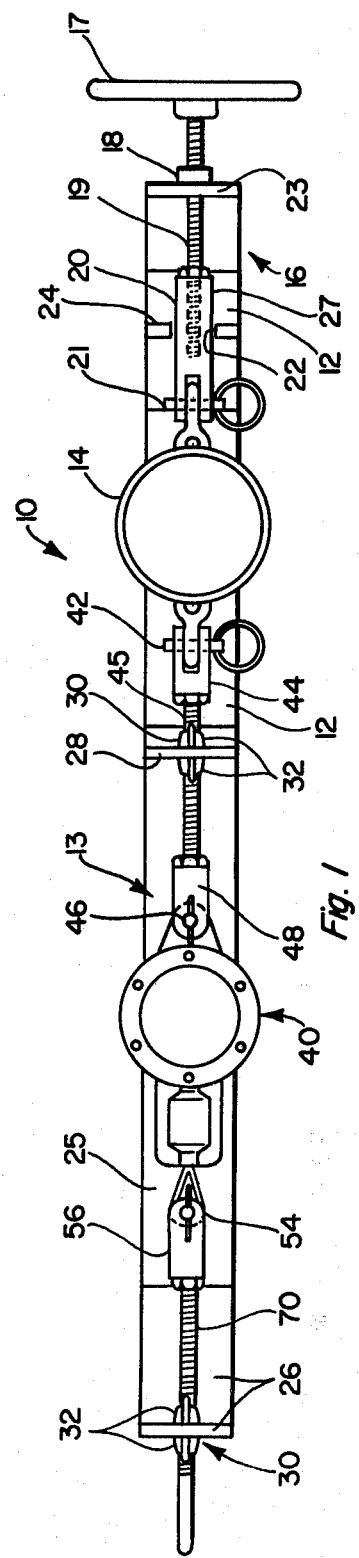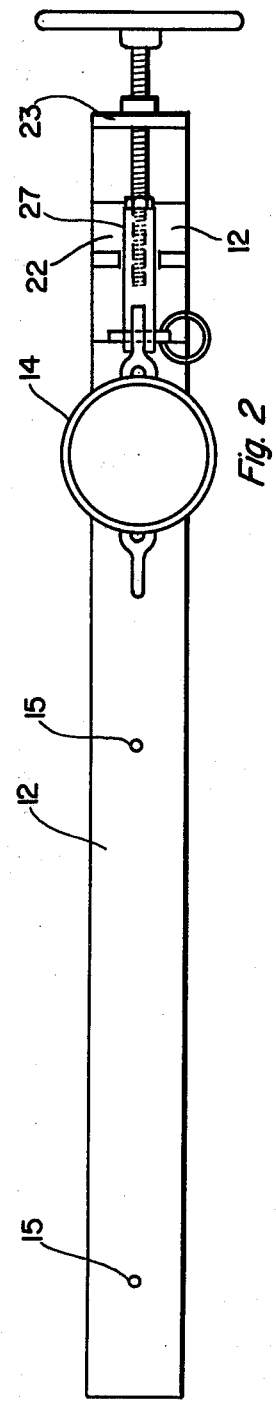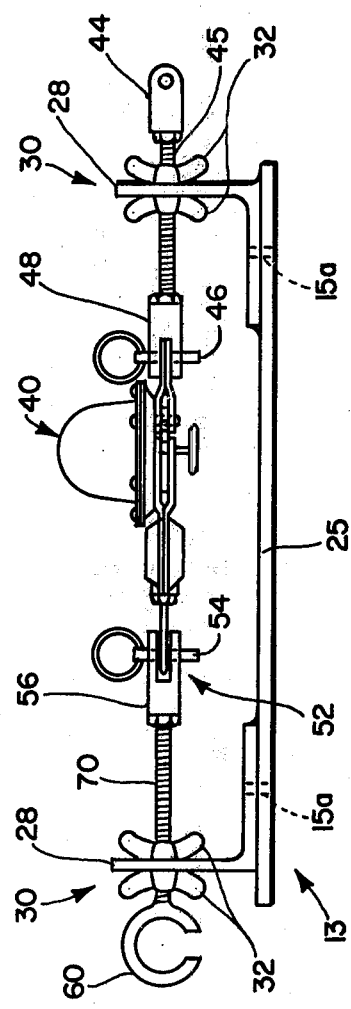

PROCESS FOR TESTING OF HYDRAULIC RELEASE DEVICES

BACKGROUND OF THE INVENTION

This invention relates to method and apparatus for testing hydraulic releases. It is believed that such apparatus is classified in U.S. Class 73-4 and International Class GOIL 27/100.

Life rafts on large vessels are most often held in place by hydraulic latch devices which are intended to release hydraulically when and if the vessel is submerged. These latches are tested and certified periodically in installations certified by the U.S. Coast Guard and U.S. Navy. Experience has shown that the existing test techniques are inadequate to assure the dependability of the latches. Despite testing failure rates are very high, perhaps approaching 20%. As a consequence, there is a trend for shippers to seek permission to use alternate, and theoretically inferior, raft-release apparatus, e.g. float-free tupe mechanisms.

Because of the theoretical superiority of the hydraulic-release device and the fact that so many shippers are already committed to their use, there is a need to provide a better testing method to assure the performance of these devices.

The most pertinent prior art is disclosed in U.S. Pat. No. 4,018,079. In that patent are shown release devices of the type to which this disclosure relates. Also shown in that patent is a testing procedure generally analogous to the procedure described herein, but over which the procedure described herein is an enormous improvement.

There are a number of kinds of hydraulic release devices presently available. Each of them comprise two separable components one of which includes a hydraulic pressure-actuated device, which upon actuation at the appropriate water depth, normally acts to open a mechanical release thereby separating the two components.

In general, the purpose of the testing is to test the ability of the hydraulically-actuated release mechanism to operate, that is to disconnect the two components, within the desired range of hydraulic pressures. In actual use conditions, this must be accomplished while the device is under stresses caused by buoyancy of the raft and, often, unforseen stresses incident to the sinking of a vessel. Thus it is desirable that a test stress on the overall latch device which simulates those stresses which may be encountered, for one reason or another, just when the device is most needed. For example, as a ship sinks, a latch device may be subjected to a variety of stresses, say from buoyancy effects on a raft, which may interfere with the separation of the aforesaid two components at the desired hydraulic pressure.

In the presently-used release latches, it is possible for these buoyancy or other stress effects to cause sufficient force to be transmitted from at least one of the separable components to the other components or to the hydraulically-actuated mechanism, e.g. a plunger spring of the diaphragm, that the release simply fails to operate at its design pressure even if the hydraulically-actuated mechanism carried by one of the components, is itself in good operating order.

It has been the practice of the prior art to put a given pull on latches during testing which may differ substantially from latch to latch depending on the type of latch that it is.

The inventor has addressed himself to providing a convenient and practical means to test release latches in such a way as to detect the ability of a latch to operate under the stress conditions which simulate those conditions it may encounter in actual use.

The description hereinbelow is described with specific reference to one of the more frequently used latch devices which is set forth for illustrative purposes in FIGS. 4 and 5. FIG. 4 shows the device in latched position wherein pivotally mounted pawls 100 on component 102 are locked onto locking bars 200 on component 202. This locking effect continues until a hydraulically-actuated plunger 204 is depressed beneath the pawls 100 and they are allowed to swing inwardly as seen in FIG. 5, thereby releasing the latch.

The problem arises in that the stresses encountered in actual use can cause undesirable frictional forces between pawls 100 and plunger 104 or even between pawls 100 and locking bars 200. These forces can substantially change the operating characteristics of the latch device.

The latch device of FIGS. 4 and 5 shows a compression spring 80. However, not all devices have compression springs and the problems discussed above exist whether or not compression springs occur in a device. It should be realized that the operation of the testing procedure overides any weakness or other defect in the spring. It is not unusual for the spring to be wholly overidden, i.e. compressed to its maximum compression during illustrated process for preparing a latch for testing. Thus, no assumption is made about the compressive values of the springs during the testing procedure, and the validity of the test procedure is not dependent on the integrity of any such spring which may be present in the particular device to be tested.

SUMMARY OF THE INVENTION

It is a principle object of the invention to provide a process of improved reliability for testing hydraulic latches or the like.

A further object of the invention is to provide novel apparatus useful in carrying out the aforesaid testing process.

Other objects of the invention will be obvious to those skilled in the art on their reading of this disclosure.

The above objects have been substantially achieved by departing from the uniform procedure of the prior act testing whereby hydraulic latches were subjected to hydraulic testing pressure either (1) by subjecting the latch device to a pre-determined strain or (2) merely causing them to be stressed with an unknown tension. Thus it becomes practical to impart any of series of test loads to a hydraulic latch release to insure its integrity and its ability to perform its intended purpose which is to separate itself under a hydraulic load caused by specified depths of submersion and thus release its buoyant life raft from its cradle. Instead, the present invention provides for a positively pre-determined stress on the latch device be utilized during the testing procedure. Use of a pre-determined stress does involves some substantial complexity in handling the release devices. This problem is solved by providing a special apparatus comprising tensioning means, dynamometer means to measure the tension with reasonable accuracy, and means to separate the tensioned release device from the dynamometer and move the jig into the test apparatus without subjecting the dynamometer to a shock release and without disturbing the preset stress on the release device.

One advantage of the process of this invention is to wholly avoid the problems associated with erroneous assumptions about the dependability of stress-strain relationships of the compression springs used in some types of the release devices. The primary advantage is to assure that a meaningful stress is applied to the mechanical interface between the two components of the release latch mechanism no matter what type of release latch is being tested. A wholly distinct and surprising aspect of the invention is the fact that applying a stress of beyond the point at which the spring can be adequately tested tends to cause the mechanical refurbishment of the moving components of the release latch and rehabilitate some latches that, but for such stress, would have been less reliable in service.

BRIEF DESCRIPTION OF THE DRAWINGS

Illustrative Embodiment of the Invention

In this application there is shown and described preferred embodiments of the invention and suggested various alternatives and modifications thereof, but it is to be understood that these are not intended to be exhaustive and that other changes and modifications can be made within the scope of the invention. These suggestions herein are selected and included for purposes of illustration in order that others skilled in the art will more fully understand the invention and the principles thereof and will be able to modify it, each as may be best suited in the condition of a particular case.

FIG. 1 is a plan view of an apparatus used to prepare a release mechanism for test with a test apparatus in place.

FIG. 2 is a plan view of the apparatus of FIG. 1 with the latch to be tested removed from the mechanism of FIG. 1 for testing.

FIG. 3 is an elevation of the removed latch and latch-holding assembly after removal from the apparatus of FIG. 1.

Referring to FIG. 1, it is seen that a release-latch test apparatus 10 comprises a steel bed plate 12 and a latch-isolator assembly 13 which is removeably mounted on pins 15 of bed plate 12. The pins fit into holes 15a on isolater plate 25. A dynamometer 14 is mounted on bed plate 12 together with stressing means 16, comprising a wheel 17 and a threaded rod 19 and a thrust bearing 18. Thrust bearing 18 is mounted in a thrust plate 23 which is, in turn, fastened to bed plate 12. Dynamometer 14 is connected to the stressing means by a clevis pin 21 and a clevis 20. Clevis 20 is rectangular in cross section, is internally threaded, and is located in a rectangular slot 22 of a bracket 24. This arrangement effectively keeps the clevis arm from rotating during the tensioning operation in which wheel 17 is turned to pull clevis 20 and the dynamometer so that rod 45 and the release are pulled towards bracket 24. On that side of the dynamometer which is furthest from the draw means, and removably mounted on steel bed plate 12, is the latch-isolator assembly 13. Near opposite ends thereof, two brackets 26 and 28 are both fixed to isolator plate 25 which in turn is affixed to bed plate 12 and the latter bracket being nearest to dynamometer 14. Each bracket has, associated with it, lock means 30 consisting, for example, of two wing-nuts 32. A hydraulically-actuatable release latch 40, which is to be tested, is mounted between brackets 26 and 28 as follows: a fastening means comprised of threaded arm 45 and two clevis-type connectors, i.e. of clevis pin 42, clevis 44 at one end thereof, and clevis pin 46 and clevis 48 at the other end thereof, are utilized to connect the dynamometer 14 to one side of release 40 which, as normally constructed, carries a hole 41 which cooperates with clevis pin 46 to effect the necessary connection.

Figure 4:
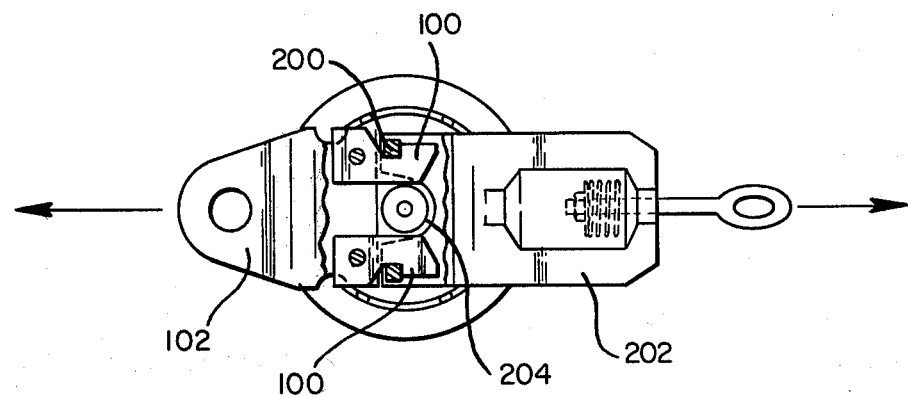
FIGS. 4 and 5, described above, are schematic plan views of a typical latch device used for defining the nature of the problem and not strictly related to the invention described herein.
Figure 5:
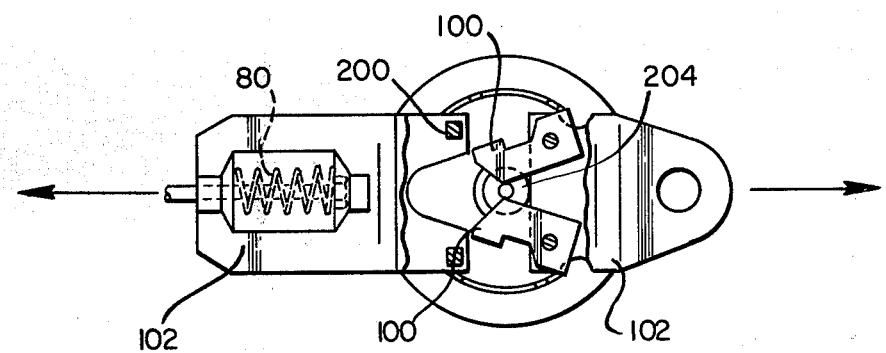

On the other end of release 40 is a similar clevis-type connection means 52, comprising pin 54, clevis 56 and a threaded positioning bar 58, and which forms attachment means, in cooperation with bracket means 26, and forms means to fix the position of the release 40 with respect to bracket 26.

It will be noted that a hook means 60 is attached to the adjusting rod 58; this hook can be used for mounting the latch 40 in the subsequent test operation.

In operation, that is in preparing to test a hydraulically-releasable latch 40, the following steps are carried out!Positioning rod 58 is locked, at bracket 26 only, by wingnuts 32 into a position that is deemed suitable for the particular requirements of the device to be tested. The release device 40 is fastened into position between brackets 26 and 28 by clevis pin 54 and 46. Rod 45 is not yet locked and can be moved laterally through the aperture in bracket 28.

Dynamometer 14 is moved by draw means 16 into such position as it can be attached via clevis 20 of rectangular side bar 27 to the draw means 16.

Thereupon, the threaded rod 19 is actuated by the turning of wheel 17. This action rotates bar 19, pulls on clevis 20 and loads dynamometer 14. Thus stress is also exerted on drawbar 45, and the release device towards wheel 17. As this occurs, the dynamometer will register the stress in psi being applied to the release device. When the stress on the dynamometer reaches the magnitude at which one wishes to test the latch 40, one tightens the threaded wing-nut locking means at bracket 27 to hold the drawbar 45 in fixed relation with bracket 28. Thus, the release 40 is locked in extension within isolator assembly 13 at the desired stress, i.e. between brackets 26 and 28. The isolating assembly 13 is then lifted from bed plate 12, the release device in desired tension, and is ready for transfer into any pressurized test environment known to the art, e.g. as described in U.S. Pat. No. 4,018,079 or in any other suitable test environment.

It is also to be understood that the following claims are intended to cover all of the generic and specific features of the invention herein described and all statements of the scope of the invention which might be said to fall therebetween.

What is claimed is:

1. A process for preparing a hydraulic release latch for testing, said process comprising the steps of attaching said latch to a dynamometer, pulling upon said latch and said dynamometer until the latch has a predetermined magnitude of stress exerted thereon, locking the latch in said stressed condition, isolating the dynamometer from the stresses on said latch and transferring said latch, while still locked in said stressed condition, into a testing environment.

2. A process as defined in claim 1 wherein, prior to removal of said latch from said stressing means, the stress on said latch is temporarily extended beyond that required to achieve the stress under which it is to be tested.

3. Apparatus useful in preparing a hydraulically-actuated release latch for testing in a pressurized environment, said apparatus comprising:
  A. Dynamometer means adapted for connection to said latch,
  B. Stressing means to import a test stress to said latch and dynamometer,
  C. Isolator means, removably mounted on said apparatus to remove said latch from said stressing means while said latch is still under said known stress.

4. Apparatus as defined in claim 3 wherein said dynamometer means is adapted to be mounted in series with said latch on a bed plate, wherein said isolator means comprises an isolator plate and two spaced lock means, one on each side of said latch, said lock means forming means to hold said latch in an extended test position between said lock means.

5. Apparatus as defined in claims 3 or 4 comprising means to release the tension on said dynamometer while maintaining tension on said latch.

* * * * *

UNITED STATES PATENT AND TRADEMARK OFFICE
CERTIFICATE OF CORRECTION

PATENT NO. : 4,217,772
DATED : August 19, 1980
INVENTOR(S) : Joseph Katz

It is certified that error appears in the above-identified patent and that said Letters Patent are hereby corrected as shown below:

Column 1, line 10    Change "GOIL" to   --G01L--

Column 4, line 44    Change "27" to   --28--

Column 4, line 34    Change "side" to   --slide--

Signed and Sealed this

Thirtieth Day of December 1980

[SEAL]

Attest:

SIDNEY A. DIAMOND

Attesting Officer          Commissioner of Patents and Trademarks